(12) United States Patent
Kou et al.

(10) Patent No.: US 11,889,535 B2
(45) Date of Patent: Jan. 30, 2024

(54) METHOD AND APPARATUS FOR SELECTING RESOURCE

(71) Applicant: ZTE CORPORATION, Guangdong (CN)

(72) Inventors: Shuaihua Kou, Shenzhen (CN); Xing Liu, Shenzhen (CN); Peng Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 180 days.

(21) Appl. No.: 17/092,052

(22) Filed: Nov. 6, 2020

(65) Prior Publication Data

US 2021/0127399 A1   Apr. 29, 2021

Related U.S. Application Data

(63) Continuation of application No. PCT/CN2019/086148, filed on May 9, 2019.

(30) Foreign Application Priority Data

May 11, 2018   (CN) .......................... 201810450405.3

(51) Int. Cl.
*H04W 72/53*   (2023.01)
*H04B 7/01*   (2006.01)
(Continued)

(52) U.S. Cl.
CPC .............. *H04W 72/53* (2023.01); *H04B 7/01* (2013.01); *H04B 7/0626* (2013.01);
(Continued)

(58) Field of Classification Search
None
See application file for complete search history.

(56) References Cited

U.S. PATENT DOCUMENTS

| 2019/0150133 | A1* | 5/2019 | Li | H04W 72/046 |
| | | | | 375/224 |
| 2019/0273637 | A1* | 9/2019 | Zhang | H04W 80/02 |

(Continued)

FOREIGN PATENT DOCUMENTS

| CN | 101754380 A | 6/2010 |
| WO | WO-2018/059487 A1 | 4/2018 |

OTHER PUBLICATIONS

First Office Action for JP Appl. No. 2020-563697, dated Jan. 7, 2022 (with English translation, 6 pages).
(Continued)

*Primary Examiner* — Ajit Patel
*Assistant Examiner* — Rodrick Mak
(74) *Attorney, Agent, or Firm* — Foley & Lardner LLP (57) ABSTRACT

Provided are a method and apparatus for selecting a resource. The method for selecting the resource includes: receiving, by a user equipment (UE), a transmission configuration indicator (TCI) state of a downlink configured by a network side device, where the TCI state at least includes: multiple pieces of Quasi co-location (QCL) information, and the multiple pieces of QCL information at least includes: a reference signal (RS) and a QCL type corresponding to the RS; and selecting, by the UE, an RS to perform radio link monitoring (RLM) according to at least one of the RS or the QCL type. Further provided are a storage medium and an electronic apparatus.

14 Claims, 2 Drawing Sheets

(51) Int. Cl.

| | | |
|---|---|---|
| *H04B 7/06* | (2006.01) | |
| *H04L 5/00* | (2006.01) | |
| *H04W 24/08* | (2009.01) | |
| *H04W 56/00* | (2009.01) | |
| *H04W 72/0453* | (2023.01) | |
| *H04W 72/30* | (2023.01) | |

(52) U.S. Cl.
CPC ........... *H04L 5/0048* (2013.01); *H04W 24/08* (2013.01); *H04W 56/001* (2013.01); *H04W 72/0453* (2013.01); *H04W 72/30* (2023.01)

(56) References Cited

U.S. PATENT DOCUMENTS

| | | | | |
|---|---|---|---|---|
| 2019/0364556 | A1* | 11/2019 | Davydov | H04W 72/02 |
| 2021/0058136 | A1* | 2/2021 | Yang | H04W 24/08 |
| 2021/0092697 | A1* | 3/2021 | Harada | H04L 5/0044 |
| 2021/0344433 | A1* | 11/2021 | Li | H04L 43/0823 |

OTHER PUBLICATIONS

OPPO., "Text Proposal for QCL" 3GPP TSG RAN WG1 Meeting #92bis, R1-1804004, Apr. 20, 2018, Sanya, China (8 pages).

3GPP, "Physical Layer Procedure for Control" 3GPP TS 38.213 V15.1.0, Mar. 31, 2018 (Mar. 31, 2018), sections 5-10 (77 pages).

International Search Report and Written Opinion for PCT Appl. No. PCT/CN2019/086148 dated Jul. 30, 2019 (with English translation, 8 pages).

3GPP: "Technical Specification Group Radio Access Network, NR, Physical layer procedures for data" 3GPP TS 38.214; V15.0.0; Internet http://www.3gpp.org; Dec. 2017 (71 pages).

Ericsson: "Remaining issues for radio link monitoring" 3GPP TSG RAN WG1 Meeting #92bis; R1-1805223; Apr. 20, 2018; Sanya, China (9 pages).

Extended European Search Report for EP Appl. No. 19800744.5, dated Jul. 7, 2021 (11 pages).

Motorola Mobility et al.: "Remaining details on radio link monitoring" 3GPP TSG RAN WG1 Meeting #92; R1-1802677; Mar. 2, 2018; Athens, Greece (4 pages).

ZTE: "Further discussion on CSI-RS based RLM" 3GPP TSG-RAN WG4 Meeting #86bis; R4-1804477; Apr. 20, 2018; Melbourne, Australia (5 pages).

Search Report and Written Opinion on SG Appl. No. 11202011119R, dated Jun. 28, 2022 (8 pages).

* cited by examiner

METHOD AND APPARATUS FOR SELECTING RESOURCE

CROSS-REFERENCE TO RELATED APPLICATIONS

This application claims the benefit of priority under 35 U.S.C. § 120 as a continuation of PCT Patent Application No. PCT/CN2019/086148 filed on May 9, 2019, which claims priority to Chinese patent application No. 201810450405.3, filed on May 11, 2018, the disclosure of each of which is incorporated herein by reference in its entirety.

TECHNICAL FIELD

The present disclosure relates to a field of communications and, in particular, to a method and apparatus for selecting a resource.

BACKGROUND

With continuous advance in radio technologies, various radio services are flourishing. However, spectrum resources for supporting the radio services are limited. With increasing bandwidth requirements, the spectrum resources of 300 MHz to 3 GHz mainly used in the traditional commercial communications are extremely strained and cannot meet requirements of the future wireless communications.

In the future wireless communications, it will be expanded to support communications with a carrier frequency higher than the carrier frequency used by the fourth generation (4G) communication system, such as 28 GHz and 45 GHz, etc., and a potential operation frequency band for a system reaches 100 GHz. In a high frequency band (which is greater than 6 GHz), due to the large attenuation of electromagnetic waves, a beamforming method is usually required for resisting the attenuation of the signal and increasing the transmission distance of the signal. Therefore, the signal is usually sent or received in a form of a beam. Generally, a network side configures one or more beams having a better quality for the UE to communicate. Because the signal quality of the beam always changes, the configured beam also changes constantly, so that the signal quality of the beam used by the UE can always meet the requirements of the communications.

To ensure normal communications, a user equipment (UE) needs to periodically detect the quality of the current link. The physical layer periodically sends an In sync (IS) indication or an Out of sync (OOS) indication to the higher layer, so that the higher layer knows the current state of the UE. Normally, the network side configures a set of specific reference signals for the UE to measure the signal quality. When a specific reference signal is not configured at the network side, the UE uses a reference signal (RS) indicated in a transmission configuration indicator (TCI) state of a physical downlink control channel (PDCCH) configured at the network side for radio link monitoring (RLM). At most two RSs may be indicated in the TCI state, since there are multiple active TCI states for the UE at the same time, if the UE detects all RSs in these multiple TCI states, a lot of problems related to measurement complexity and power consumption will be brought. In addition, some RSs are not suitable for the UE to perform the RLM. Therefore, how to choose a suitable RS for the UE to perform the RLM is an urgent problem to be solved.

SUMMARY

Embodiments of the present disclosure provide a method and apparatus for selecting a resource for at least solving a lot of problems related to measurement complexity and power consumption brought to the UE in the related art when detecting all RSs in multiple TCI states because a suitable RS cannot be selected for the RLM.

According to an embodiment of the present disclosure, a method for selecting a resource is provided. The method includes steps described below. A user equipment (UE) receives a transmission configuration indicator (TCI) state of a downlink configured by a network side device, where the TCI state at least includes: multiple pieces of Quasi co-location (QCL) information, and the multiple pieces of QCL information at least includes: a reference signal (RS) and a QCL type corresponding to the RS. The UE selects an RS to perform radio link monitoring (RLM) according to at least one of the RS or the QCL type.

According to another embodiment of the present disclosure, an apparatus for selecting a resource is further provided. The apparatus includes a first receiving module and a selecting module. The first receiving module is configured to receive a transmission configuration indicator (TCI) state of a downlink configured by a network side device; where the TCI state at least includes: multiple pieces of Quasi co-location (QCL) information, and the multiple pieces of QCL information at least includes: a reference signal (RS) and a QCL type corresponding to the RS. The selecting module is configured to select an RS to perform radio link monitoring (RLM) according to at least one of the RS or the QCL type.

According to another embodiment of the present disclosure, a storage medium is further provided. The storage medium stores computer programs which, when executed, execute the steps of any one of the method embodiments described above.

According to another embodiment of the present disclosure, an electronic apparatus is further provided, including a memory and a processor. The memory is configured to store computer programs and the processor is configured to execute the computer programs for executing the steps of any one of the method embodiments described above.

BRIEF DESCRIPTION OF DRAWINGS

The drawings described herein are used to provide a further understanding of the present disclosure and form a part of the present application. The illustrative embodiments and descriptions thereof in the present disclosure are used to explain the present disclosure and do not limit the present disclosure in any improper way. In the drawings.

DETAILED DESCRIPTION

The present disclosure will be described hereinafter in detail with reference to the drawings and in conjunction with embodiments. It is to be noted that if not in collision, the embodiments and features therein in the present application can be combined with each other.

It is to be noted that the terms "first", "second" and the like in the description, claims and above drawings of the present disclosure are used to distinguish between similar objects and are not necessarily used to describe a particular order or sequence.

Embodiment One

Figure 1:
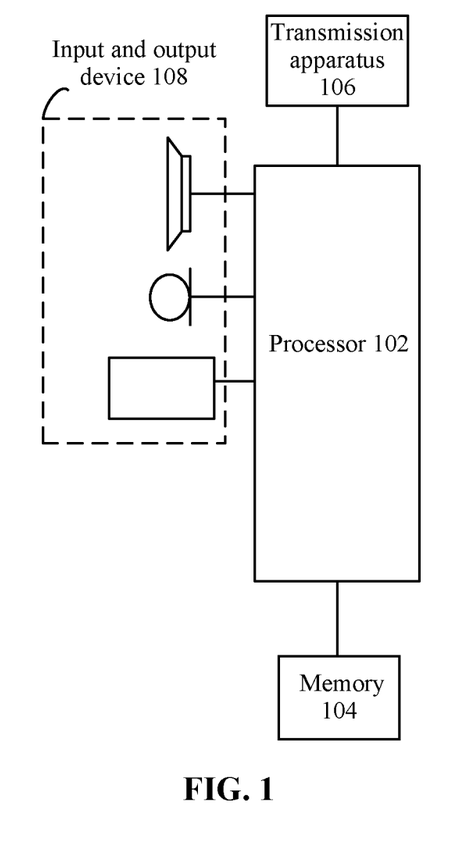
FIG. 1 is a block diagram of a hardware structure of a mobile terminal for executing a method for selecting a resource according to the embodiment of the present disclosure.

A method embodiment provided by the embodiment one of the present application may be executed in a mobile terminal, a computer terminal or other similar computing apparatuses. Taking the method to be executed in the mobile terminal as an example, FIG. 1 is a block diagram of a hardware structure of a mobile terminal for executing a method for selecting a resource according to the embodiment of the present disclosure. As shown in FIG. 1, a mobile terminal 10 may include one or more (only one is shown in FIG. 1) processors 102 (the processor 102 may include, but is not limited to, a processing apparatus such as a microcontroller unit (MCU) or a field-programmable gate array (FPGA)), a memory 104 used for storing data, optionally, the mobile terminal may further include an input and output device 108 and a transmission apparatus 106 used for implementing a communication function. It is to be understood by those skilled in the art that the structure shown in FIG. 1 is merely illustrative and not intended to limit the structure of the preceding mobile terminal. For example, the mobile terminal 10 may further include more or fewer components than the components shown in FIG. 1, or may have a configuration different from the configuration shown in FIG. 1. The memory 104 may be used for storing computer programs, such as software programs and modules of application software, such as computer programs corresponding to the method for selecting the resource in the embodiments of the present disclosure. The processor 102 executes the computer programs stored in the memory 104 so as to perform one or more function applications and data processing, that is, to implement the method described above. The memory 104 may include a high-speed random access memory, or may further include a nonvolatile memory such as one or more magnetic storage apparatuses, flash memories or other nonvolatile solid-state memories. In some examples, the memory 104 may further include memories that are remotely disposed with respect to the processor 102. These remote memories may be connected to the mobile terminal 10 via a network. Examples of the above network include, but are not limited to, the Internet, an intranet, a local area network, a mobile communication network and a combination thereof.

The transmission apparatus 106 is configured to receive or transmit data via a network. Specific examples of the above network may include a wireless network provided by a communication provider of the mobile terminal 10. In an example, the transmission apparatus 106 includes a network interface controller (NIC), which may be connected to other network devices via a base station, thereby communicating with the Internet. In one example, the transmission apparatus 106 may be a radio frequency (RF) module, which is configured to communicate with the Internet in a wireless way.

Figure 2:
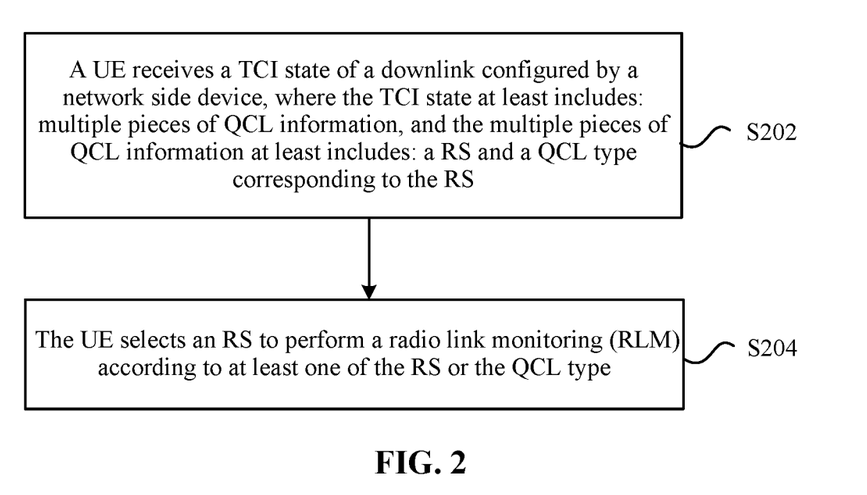
FIG. 2 is a flowchart of a method for selecting a resource according to the embodiment of the present disclosure.

A method for selecting a resource to be executed in the mobile terminal described above is provided in this embodiment. FIG. 2 is a flowchart of a method for selecting a resource according to the embodiment of the present disclosure. As shown in FIG. 2, the method includes steps described below.

In step 202, a user equipment (UE) receives a transmission configuration indicator (TCI) state of a downlink configured by a network side device, where the TCI state at least includes: multiple pieces of Quasi co-location (QCL) information, and the multiple pieces of QCL information at least includes: a reference signal (RS) and a QCL type corresponding to the RS. In step S204, the UE selects an RS to perform a radio link monitoring (RLM) according to at least one of the RS or the QCL type.

Through the present disclosure, each RS and the corresponding QCL type in the multiple pieces of QCL information in the TCI state sent from a network side device are screened, and then the RS which is to be used for the RLM may be selected. Therefore, a lot of problems related to measurement complexity and power consumption brought to the UE in the related art when detecting all RSs in multiple TCI states because a suitable RS cannot be selected for the RLM may be solved, achieving the effect of reducing the measurement overhead of the UE. In one embodiment, when the TCI state of a PDCCH of the UE includes multiple pieces of QCL information, i.e., multiple RSs, the UE selects one RS used for the RLM.

In one embodiment, the multiple pieces of QCL information further include: a TCI state ID used for identifying the TCI state.

In one embodiment, in mobile communications, the UE in a connected state needs to periodically detect and evaluate the signal quality of the downlink, and the physical layer of the UE sends an IS indication or an OOS indication to the higher layer according to the evaluation result. The network side may configure multiple RSs for the UE for detection. The UE measures, filters and evaluate these RSs separately. When the signal quality of all RSs is less than a threshold, the physical layer reports the OOS indication to the higher layer. When the signal quality of at least one RS is greater than a threshold, the physical layer reports the IS indication to the higher layer. This process is also called the radio link monitoring.

In one embodiment, an RS type includes at least one of: a synchronization signal and physical broadcast channel block (SS/PBCH block), a channel state information reference signal (CSI-RS), and a tracking reference signal (TRS).

In one embodiment, the QCL type includes at least one of: a first QCL type carrying Doppler shift, Doppler spread, average delay and delay spread; a second QCL type carrying Doppler shift and Doppler spread; a third QCL type carrying average delay and Doppler shift; or a fourth QCL type carrying a Spatial Receive (Rx) parameter.

It should be noted that if two RSs have a QCL relationship and the QCL type is the first QCL type, then for reception of the UE, these two RSs have same or similar Doppler shift, Doppler spread, average delay and delay spread, that is, the UE detects that the Doppler shift, Doppler spread, average delay and delay spread of these two RSs are the same or similar. If two RSs have the QCL relationship and the QCL type is the second QCL type, then for reception of the UE, these two RSs have same or similar Doppler shift and Doppler spread, that is, the UE detects that the Doppler shift and Doppler spread of these two RSs are the same or similar. If two RSs have the QCL relationship and the QCL type is the third QCL type, then for reception of UE, these two RSs have same or similar average delay and Doppler shift, that is, the UE detects that the average delay and Doppler shift of these two RSs are the same or similar. If the two RSs have the QCL relationship and the QCL type is the fourth QCL type, then for reception of UE, the UE detects that the two RSs have the same or similar spatial directions, or transmission beam directions of these two RSs are the same or similar. If two RSs have the QCL relationship and the QCL type is more than one of the above-mentioned QCL types, then from the perspective of the UE, the two RSs simultaneously satisfy the features of the multiple QCL types.

In one embodiment, the UE receives signals on multiple bandwidth parts (BWPs) configured by the network side device, the multiple BWPs are obtained by dividing a system bandwidth into multiple parts by the network side device. The UE receives a signal sent by the network side device on one or more activated BWPs in the multiple BWPs configured by the network side device, or the UE transmits the signal to the network side device on one or more activated BWPs in the multiple BWPs configured by the network side device.

It should be noted that in order to better facilitate receiving signal from the network side and sending the signal to the network for the UE, usually the network side may divide the system bandwidth into multiple parts, and each part is called one BWP. The network side may configure multiple BWPs for the UE at the same time, and activate one or more of the multiple BWPs. The UE only receives the signal sent by the network side on the activated downlink BWP and sends the signal on the activated uplink BWP.

In one embodiment, the UE selects one RS located in the activated BWPs in the multiple pieces of QCL information to perform the RLM; or selects multiple RSs located in the activated BWPs in the multiple pieces of QCL information as candidate RSs, where the candidate RSs have a capability of being performed the RLM.

Specifically, when the number of signals (such as the RSs) sent and received between the network side device and the user equipment is small, in order to avoid waste of resources, the network side device may only allocate one activated BWP to the UE for signal transmission and reception. Therefore, when the UE receives the QCL information included in the TCI state of the network side device, the UE first detects whether the BWP corresponding to the RS in the QCL information is activated. If the BWP is activated, it means that the RS may be sent and received between the network side device and the user equipment, so the RLM needs to be performed. Therefore, the UE selects the RS corresponding to the activated BWP for the RLM. Specifically, the network side device may only allocate multiple activated BWPs to the UE for transmission and reception of the RS. When the UE receives the QCL information included in the TCI state of the network side device, the UE first detects whether the BWP corresponding to the RS in the QCL information is activated. If the BWP is activated, it means that the RS may be sent and received between the network side device and the user equipment, so the RLM needs to be performed. However, considering the measurement complexity and power consumption problems generated in the process of detecting the multiple RSs, only one RS for the RLM is provided. Therefore, the UE uses the RS corresponding to the activated BWP in the multiple pieces of QCL information as the candidate RS, which needs to be filtered by other conditions.

In one embodiment, in condition that the UE selects the multiple RSs located in the activated BWPs and in the multiple pieces of QCL information as the candidate RSs, the step in which the UE selects the RS to perform the RLM according to at least one of the RS or the QCL type in the multiple pieces of QCL information further includes steps described below. The UE configures a priority order of the activated BWPs corresponding to the multiple candidate RSs, or the UE acquires a priority order of the activated BWPs configured by the network side device, or the UE acquires a priority order of the activated BWPs specified by a protocol. The UE selects an RS corresponding to an activated BWP having a highest priority to perform the RLM according to the priority order of the activated BWPs.

Specifically, the priority order of the BWPs specified by the protocol is: BWP1 (a first activated BWP)>BWP2 (a second activated BWP)>BWP3 (a third activated BWP) >BWP4 (a fourth activated BWP)> . . . >BWPn (an nth activated BWP, where n is a positive integer).

In one embodiment, the UE configures a priority order of the QCL type, or the UE acquires a priority order of the QCL type configured by the network side device, or the UE acquires a priority order of the QCL type specified by the protocol. The UE selects an RS corresponding to a QCL type having a highest priority to perform the RLM according to the priority order of the QCL type.

Specifically, the priority order of the QCL type specified by the protocol is: the fourth QCL type>the third QCL type>the second QCL type>the first QCL type.

In one embodiment, the UE configures a priority order of an RS type corresponding to the RS, or the UE acquires a priority order of an RS type corresponding to the RS configured by the network side device, or the UE acquires a priority order of an RS type corresponding to the RS specified by the protocol. The UE selects an RS having a highest priority to perform the RLM according to the priority order of the RS type.

Specifically, the priority order of the RS type specified by the protocol is: the CSI-RS>the SSB>the TRS.

In one embodiment, the UE configures a combination priority order of the QCL type and an RS type corresponding to the RS, or the UE acquires a combination priority order of an RS type corresponding to the RS and the QCL type configured by the network side device, or the UE acquires a combination priority order of an RS type corresponding to the RS and the QCL type specified by the protocol. The UE selects an RS having a highest combination priority to perform the RLM according to the combination priority order.

Specifically, the combination priority specified by the protocol may be determined by a sequence in Table 1 described below. It should be noted that the priority is arranged according to 0 to 11 from highest to lowest.

TABLE 1

| Priority | RS type | QCL type |
| --- | --- | --- |
| 0 | CSI-RS | Fourth QCL type |
| 1 | TRS | Fourth QCL type |
| 2 | CSI-RS | First QCL type |
| 3 | TRS | First QCL type |
| 4 | SSB | Fourth QCL type |
| 5 | SSB | First QCL type |
| 6 | CSI-RS | Third QCL type |
| 7 | TRS | Third QCL type |
| 8 | CSI-RS | Second QCL type |
| 9 | TRS | Second QCL type |
| 10 | SSB | Third QCL type |
| 11 | SSB | Second QCL type |

It should be noted that in order to facilitate the understanding of the above contents in this embodiment, the following scenarios are also provided in this embodiment to facilitate understanding of the solutions described in this embodiment.

It should be noted that, for the ease of example, in the following scenarios, it is defaulted that the UE uses the priority order specified by the protocol for ordering. Of course, the method for ordering according to the priority order configured by the UE or the priority order configured by the network side device is also within the protection scope of this embodiment, which will not be repeated here.

Scenario One

The UE receives the TCI state of the PDCCH configured by the network side device. The TCI state includes: a TCI state ID and two pieces of QCL information. An RS1 and the first QCL type are included in a first piece of QCL information. An RS2 and the second QCL type are included in a second piece of QCL information.

The UE determines the priority of the QCL type in the two pieces of received QCL information. Thus it is determined that the priority of the QCL type in the second piece of QCL information is greater than the priority of the QCL type in the first piece of QCL information. Therefore, the UE selects the RS included in the second piece of QCL information to perform the RLM.

Scenario Two

The UE receives the TCI state of the PDCCH configured by the network side device. The TCI state includes: a TCI state ID and three pieces of QCL information. The RS1, the second QCL type and the fourth QCL type are included in the first piece of QCL information. The RS2 and the third QCL type are included in the second piece of QCL information. An RS3, the first QCL type and the second QCL type are included in a third piece of QCL information.

The UE determines the priority of the QCL type in the three pieces of received QCL information. Thus it is determined that the first piece of QCL information includes the fourth QCL type having a highest priority, priorities of the third QCL type included in the second piece of QCL information, as well as the first QCL type and the second QCL type included in the third piece of QCL information are smaller than the priority of the fourth QCL type in the first piece of QCL information. Therefore, the UE selects the RS included in the first piece of QCL information to perform the RLM.

Scenario Three

The UE receives the TCI state of the PDCCH configured by the network side device. The TCI state includes: a TCI state ID and two pieces of QCL information. The SSB and the second QCL type are included in the first piece of QCL information. The CSI-RS and the second QCL type are included in the second piece of QCL information.

The UE determines the RS type in the two pieces of received QCL information. Thus it is determined that the priority of the RS type of the CSI-RS in the second piece of QCL information is greater than the priority of the RS type of the SSB in the first piece of QCL information. Therefore, the UE selects the RS included in the second piece of QCL information to perform the RLM.

Scenario Fourth

The UE receives the TCI state of the PDCCH configured by the network side device. The TCI state includes: a TCI state ID and two pieces of QCL information. The SSB and the second QCL type are included in the first piece of QCL information. The CSI-RS and the fourth QCL type are included in the second piece of QCL information.

The UE considers both the RS type and the QCL type to select the RS for the RLM. The UE determines that a combination priority of the RS type and the QCL type in the second piece of QCL information is the highest according to the combination priority order in Table 1 described above, and a combination priority of the RS type and the QCL type in the first piece of QCL information is smaller than the combination priority of the RS type and the QCL type in the second piece of QCL information. Therefore, the UE selects the RS included in the second piece of QCL information to perform the RLM.

Scenario Five

The UE receives the TCI state of the PDCCH configured by the network side device. The TCI state includes: a TCI state ID and two pieces of QCL information. The TRS and the first QCL type are included in the first piece of QCL information. The CSI-RS1 and the third QCL type are included in the second piece of QCL information.

The UE considers both the RS type and the QCL type to select the RS for the RLM. The UE determines that the combination priority of the RS type and the QCL type in the first piece of QCL information is greater than the combination priority of the RS type and the QCL type in the second piece of QCL information according to the priority order in Table 1 described above. Therefore, the UE selects the RS included in the first piece of QCL information for the RLM instead of the RS included in the second piece of QCL information.

Scenario Sixth

The UE receives the TCI state of the PDCCH configured by the network side device. The TCI state includes: a TCI state ID and multiple pieces of QCL information. Only one BWP of the BWPs allocated by the network side device is activated by the UE. And the other BWPs are not activated. The RS1 included in the first piece of QCL information is located in the active BWP. The RS2 included in the second piece of QCL information is located in the non-active BWP. The UE determines that only the RS1 in the first piece of QCL information is in the active BWP by acquiring multiple pieces of QCL information and multiple BWPs configured by the network side device. Therefore, the UE selects the only one RS1 located in the active BWP for the RLM.

Scenario Seven

The UE receives the TCI state of the PDCCH configured by the network side device. The TCI state includes: a TCI state ID and three pieces of QCL information. Only one BWP of the BWPs allocated by the network side device is activate. And the other BWPs are not activated. The RS1 in the first piece of QCL information and the RS2 in the first piece of QCL information are in the active BWP. The RS3 included in the third piece of QCL information is in the non-active BWP. At the same time, the RS1 and the first QCL type are included in the first piece of QCL information. The RS2 and the second QCL type are included in the second piece of QCL information.

The UE determines that the RS1 in the first piece of QCL information and the RS2 in the second piece of QCL information are in the active BWP by acquiring multiple pieces of QCL information and multiple BWPs configured by the network side device. It cannot determine that which RS in the QCL information is used for the RLM. Therefore, the UE uses the RS1 in the first piece of QCL information and the RS2 in the second piece of QCL information as candidate RSs for the RLM for subsequent further screening.

The UE needs to determine the RS type in the two pieces of received QCL information in this case. Thus it is determined that the priority of the second QCL type in the second piece of QCL information is greater than the priority of the first QCL type in the first piece of QCL information. Therefore, the UE selects the RS included in the second piece of QCL information to perform the RLM.

Scenario Eight

The UE receives the TCI state of a PDSCH configured by the network side device. The TCI state includes: a TCI state ID and four pieces of QCL information. The UE receives that BWP1, BWP2 and BWP3 are activated in the BWPs allocated by the network side device, and other BWPs are not activated.

The first piece of QCL information includes: the first QCL type and the CSI-RS located in the active BWP3. The second piece of QCL information includes: the second QCL type and the TRS located in the active BWP1. The third piece of QCL information includes: the third QCL type and the SSB located in the active BWP1. The fourth piece of QCL information includes: the fourth QCL type and the CSI-RS located in the non-active BWP.

The UE determines that priorities of the active BWPs corresponding to the TRS in the second piece of QCL information and the SSB in the third piece of QCL information are the same and are greater than a priority of the active BWP3 corresponding to the CSI-RS in the first piece of QCL information. At the same time, the CSI-RS in the fourth piece of QCL information is located in the non-active BWP. Therefore, the UE uses the TRS in the second piece of QCL information and the SSB in the third piece of QCL information as the candidate RSs for the RLM.

The RS1 in the first piece of QCL information and the RS2 in the second piece of QCL information are in the active BWP. It cannot determine that which RS in the QCL information is used for the RLM. Therefore, the UE uses the RS1 in the first piece of QCL information and the RS2 in the second piece of QCL information as candidate RSs for the RLM for subsequent further screening.

The UE determines that a combination priority of the RS type and the QCL type in the second piece of QCL information is greater than a combination priority of the RS type and the QCL type in the third piece of QCL information according to the priority order in Table 1 described above. Therefore, the UE selects the RS included in the second piece of QCL information for the RLM instead of the RS included in the third piece of QCL information.

It should be noted that the above specific examples are not exhaustive. Any selection solution based on the ideas of the present disclosure is within the protection scope of this embodiment. Through the above steps, a lot of problems related to measurement complexity and power consumption problems brought to the UE in the related art when detecting all RSs in multiple TCI states because a suitable RS cannot be selected to perform the RLM are solved, achieving the effect of reducing the measurement overhead of the UE.

From the description of the implementation modes described above, it will be apparent to those skilled in the art that the method of the above embodiment may be implemented by means of software plus a general-purpose hardware platform, or may of course be implemented by hardware. Based on this understanding, the solution of the present disclosure substantially, or the part contributing to the related art, may be embodied in the form of a software product. The computer software product is stored in a storage medium (such as a read-only memory (ROM)/ random access memory (RAM), a magnetic disk or an optical disk) and includes multiple instructions for enabling a terminal device (which may be a mobile phone, a computer, a server, a network device or the like) to execute the method according to one or more embodiments of the present disclosure.

Embodiment Two

An embodiment of the present disclosure further provides an apparatus for selecting a resource for implementing the above-mentioned embodiments and implementation modes. What has been described will not be repeated. As used below, the term "module" may be software, hardware or a combination thereof capable of implementing predetermined functions. The devices described below in the embodiment may be implemented by the software, but implementation by the hardware or by a combination of the software and the hardware is also possible and conceived.

Figure 3:
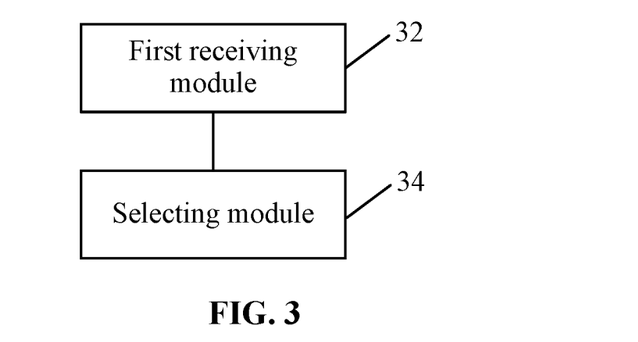
FIG. 3 is a structural diagram of an apparatus for selecting a resource according to the embodiment of the present disclosure.

FIG. 3 is a structural diagram of an apparatus for selecting a resource according to the embodiment of the present disclosure. As shown in FIG. 3, the apparatus includes a first receiving module 32 and a selecting module 34.

The first receiving module 32 is used for receiving a transmission configuration indicator (TCI) state of a downlink configured by a network side device, where the TCI state at least includes: multiple pieces of Quasi co-location (QCL) information, and the multiple pieces of QCL information at least includes: a reference signal (RS) and a QCL type corresponding to the RS. The selecting module 34 is used for selecting an RS to perform a radio link monitoring (RLM) according to at least one of the RS or the QCL type.

Figure 4:
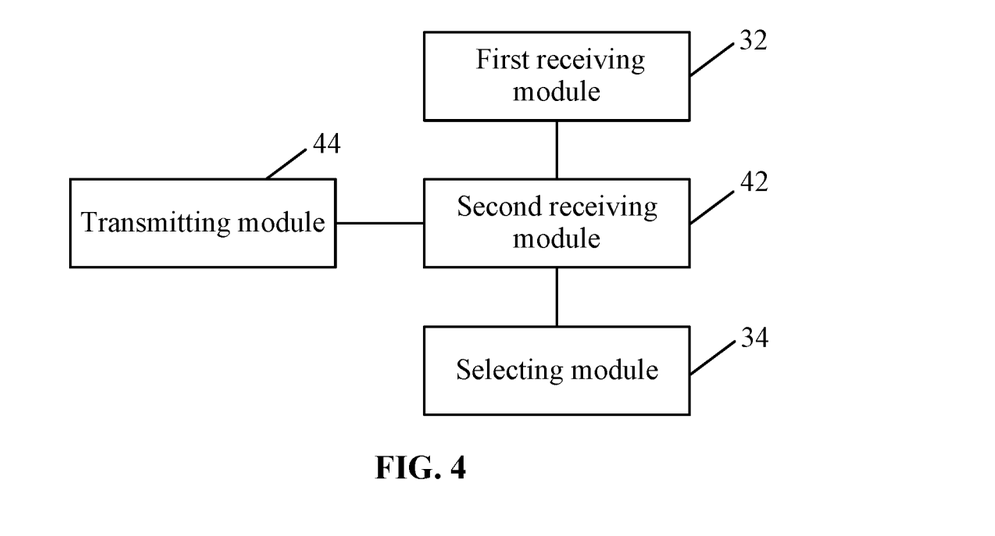
FIG. 4 is a structural diagram of another apparatus for selecting a resource according to the embodiment of the present disclosure.

FIG. 4 is a structural diagram of another apparatus for selecting a resource according to the embodiment of the present disclosure. As shown in FIG. 4, the apparatus further includes a second receiving module 42 and a transmitting module 44 in addition to all of the modules shown in FIG. 3.

The second receiving module 42 is used for receiving multiple bandwidth parts (BWPs) configured by the network side device, where the multiple BWPs are obtained by dividing a system bandwidth into multiple parts by the network side device.

The transmitting module is configured to receive a signal sent by the network side device on one or more activated BWPs in the multiple BWPs configured by the network side device, or send the signal to the network side device on one or more activated BWPs in the multiple BWPs configured by the network side device.

In one embodiment, the selecting module 34 is further used for selecting one RS located in the activated BWPs in the multiple pieces of QCL information to perform the RLM; or selecting multiple RSs located in the activated BWPs in the multiple pieces of QCL information as candidate RSs, where the candidate RSs have a capability of being performed the RLM.

In one embodiment, in condition that the multiple RSs located in the activated BWPs in the multiple pieces of QCL information are selected as the candidate RSs, the selecting module 34 is further used for: configuring a priority order of the activated BWPs corresponding to the multiple candidate RSs, or acquiring a priority order of the activated BWPs configured by the network side device, or acquiring a priority order of the activated BWPs specified by a protocol; and selecting an RS corresponding to an activated BWP having a highest priority to perform the RLM according to the priority order of the activated BWPs.

In one embodiment, the selecting module is further used for: configuring a priority order of the QCL type, or acquiring a priority order of the QCL type configured by the network side device, or acquiring a priority order of the QCL type specified by the protocol; and selecting an RS corresponding to a QCL type having a highest priority to perform the RLM according to the priority order of the QCL type.

In one embodiment, the selecting module 34 is further used for: configuring a priority order of an RS type corresponding to the RS, or acquiring a priority order of an RS type corresponding to the RS configured by the network side device, or acquiring a priority order of an RS type corresponding to the RS specified by the protocol; and selecting an RS having a highest priority to perform the RLM according to the priority order of the RS type.

In one embodiment, the selecting module 34 is further used for: configuring, by the UE, a combination priority order of the QCL type and an RS type corresponding to the RS, or acquiring, by the UE, a combination priority order of an RS type corresponding to the RS and the QCL type configured by the network side device, or acquiring, by the UE, a combination priority order of an RS type corresponding to the RS and the QCL type specified by the protocol; and selecting an RS having a highest combination priority to perform the RLM according to the combination priority order.

It is to be noted that the above modules described above may be implemented by software or hardware. Implementation by hardware may, but may not necessarily, be performed in the following manners: the above modules described above are located in the same processor, or, in any combination, the various modules described above are located in different processors.

Embodiment Three

An embodiment of the present disclosure further provides a storage medium. The storage medium is configured to store computer programs which, when run, execute the steps of any one of the above-mentioned method embodiments.

In one embodiment, in this embodiment, the preceding storage medium may be configured to store computer programs for executing the steps described below.

In S1, a user equipment (UE) receives a transmission configuration indicator (TCI) state of a downlink configured by a network side device, where the TCI state at least includes: multiple pieces of Quasi co-location (QCL) information, and the multiple pieces of QCL information at least includes: a reference signal (RS) and a QCL type corresponding to the RS.

In S2, the UE selects an RS to perform a radio link monitoring (RLM) according to at least one of the RS or the QCL type.

In one embodiment, in this embodiment, the storage medium may include, but is not limited to, a universal serial bus flash disk, a read-only memory (ROM), a random access memory (RAM), a mobile hard disk, a magnetic disk, an optical disk or another medium capable of storing computer programs.

Embodiment Four

An embodiment of the present disclosure further provides an electronic apparatus, including a memory and a processor, where the memory is configured to store computer programs and the processor is configured to execute the computer programs for executing the steps in any one of the method embodiments described above.

In one embodiment, the electronic apparatus described above may further include a transmission device and an input and output device, where both the transmission device and the input and output device are connected to the processor described above.

In one embodiment, in this embodiment, the above processor may be configured to execute steps described below through the computer programs.

In S1, a user equipment (UE) receives a transmission configuration indicator (TCI) state of a downlink configured by a network side device, where the TCI state at least includes: multiple pieces of Quasi co-location (QCL) information, and the multiple pieces of QCL information at least includes: a reference signal (RS) and a QCL type corresponding to the RS.

In S2, the UE selects an RS to perform a radio link monitoring (RLM) according to at least one of the RS or the QCL type.

In one embodiment, for specific examples of this embodiment, see the examples described in the embodiments and optional implementations described above, and the specific examples will not be described in this embodiment.

Apparently, it should be understood by those skilled in the art that the modules or steps of the present disclosure described above may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into one or more integrated circuit modules separately, or multiple modules or steps therein may be made into a single integrated circuit module for implementation. In this way, the present disclosure is not limited to any specific combination of hardware and software.

What is claimed is:

1. A method for selecting a resource, comprising generating or transmitting a message:
   receiving, by a user equipment (UE), a transmission configuration indicator (TCI) state of a downlink transmission, wherein the TCI state comprises Quasi co-location (QCL) information, and the QCL information comprises a plurality of correspondences between a respective reference signal (RS) of a plurality of RSs and a corresponding QCL type of a plurality of QCL types;
   selecting, by the UE, an RS of the plurality of RSs according to a QCL type of the plurality of QCL types, the RS located in an active bandwidth part (BWP), the active BWP indicated in the QCL information; and
   performing, by the UE, radio link monitoring (RLM) according to the RS selected according to the corresponding QCL type.

2. The method of claim 1, wherein the RS comprises at least one of:
   a synchronization signal and physical broadcast channel block (SS/PBCH block) or a channel state information reference signal (CSI-RS).

3. The method of claim 1, wherein the QCL types comprise:
   a first QCL type carrying Doppler shift, Doppler spread, average delay and delay spread;
   a second QCL type carrying Doppler shift and Doppler spread;
   a third QCL type carrying average delay and Doppler shift; and
   a fourth QCL type carrying a Spatial Receive (Rx) parameter.

4. The method of claim 1, wherein the downlink transmission comprises a physical downlink control channel (PDCCH).

5. A method for selecting a resource, comprising:
receiving, by a user equipment (UE), a transmission configuration indicator (TCI) state of a downlink transmission, wherein the TCI state comprises Quasi co-location (QCL) information, and the QCL information comprises a plurality of correspondences between a respective reference signal of a plurality of RSs and a corresponding QCL type of a plurality of QCL types;
wherein the plurality of QCL types comprise:
a first QCL type carrying Doppler shift, Doppler spread, average delay and delay spread;
a second QCL type carrying Doppler shift and Doppler spread;
a third QCL type carrying average delay and Doppler shift; and
a fourth QCL type carrying a Spatial Receive (Rx) parameter;
selecting, by the UE, a RS of the plurality of RSs according to the fourth QCL type, the RS located in an active bandwidth part (BWP), the active BWP indicated in the QCL information; and
performing, by the UE, radio link monitoring (RLM) according to the RS selected according to the corresponding fourth QCL type.

6. The method of claim 5, wherein the RS comprises at least one of:
a synchronization signal and physical broadcast channel block (SS/PBCH block) or a channel state information reference signal (CSI-RS).

7. The method of claim 5, wherein the downlink transmission comprises a physical downlink control channel (PDCCH).

8. An apparatus, comprising at least one processor configured to:
receive a transmission configuration indicator (TCI) state of a downlink transmission, wherein the TCI state comprises Quasi co-location (QCL) information, and the QCL information comprises a plurality of correspondences between a respective reference signal (RS) of a plurality of RSs and a corresponding QCL type of a plurality of QCL types;
select an RS of the plurality of RSs according to a QCL type of the plurality of QCL types, the RS located in an active bandwidth part (BWP), the active BWP indicated in the QCL information; and
perform radio link monitoring (RLM) according to the RS selected according to the corresponding QCL type.

9. The apparatus of claim 8, wherein the RS comprises at least one of:
a synchronization signal and physical broadcast channel block (SS/PBCH block) or a channel state information reference signal (CSI-RS).

10. The apparatus of claim 8, wherein the QCL types comprise:
a first QCL type carrying Doppler shift, Doppler spread, average delay and delay spread;
a second QCL type carrying Doppler shift and Doppler spread;
a third QCL type carrying average delay and Doppler shift; and
a fourth QCL type carrying a Spatial Receive (Rx) parameter.

11. The apparatus of claim 8, wherein the downlink transmission comprises a physical downlink control channel (PDCCH).

12. An apparatus comprising at least one processor, configured to:
receive a transmission configuration indicator (TCI) state of a downlink transmission, wherein the TCI state comprises Quasi co-location (QCL) information, and the QCL information comprises a plurality of correspondences between a respective reference signal of a plurality of RSs and a corresponding QCL type of a plurality of QCL types;
wherein the plurality of QCL types comprise:
a first QCL type carrying Doppler shift, Doppler spread, average delay and delay spread;
a second QCL type carrying Doppler shift and Doppler spread;
a third QCL type carrying average delay and Doppler shift; and
a fourth QCL type carrying a Spatial Receive (Rx) parameter;
select a RS of the plurality of RSs according to the fourth QCL type, the RS located in an active bandwidth part (BWP), the active BWP indicated in the QCL information; and
perform radio link monitoring (RLM) according to the RS selected according to the corresponding fourth QCL type.

13. The apparatus of claim 12, wherein the RS comprises at least one of:
a synchronization signal and physical broadcast channel block (SS/PBCH block) or a channel state information reference signal (CSI-RS).

14. The apparatus of claim 12, wherein the downlink transmission comprises a physical downlink control channel (PDCCH).

* * * * *

UNITED STATES PATENT AND TRADEMARK OFFICE
CERTIFICATE OF CORRECTION

| | | |
|---|---|---|
| PATENT NO. | : 11,889,535 B2 | Page 1 of 1 |
| APPLICATION NO. | : 17/092052 | |
| DATED | : January 30, 2024 | |
| INVENTOR(S) | : Shuaihua Kou, Xing Liu and Peng Hao | |

It is certified that error appears in the above-identified patent and that said Letters Patent is hereby corrected as shown below:

In the Claims

In Claim 1, Column 12, Lines 33-34, please delete "generating or transmitting a message"

In Claim 5, Column 13, Line 19, please delete "a RS" and insert -- an RS --

In Claim 12, Column 14, Line 35, please delete "a RS" and insert -- an RS --

Signed and Sealed this
Ninth Day of April, 2024

*Katherine Kelly Vidal*

Katherine Kelly Vidal
*Director of the United States Patent and Trademark Office*